United States Patent
Mangalagiri et al.

(10) Patent No.: US 12,554,249 B1
(45) Date of Patent: Feb. 17, 2026

(54) SYSTEMS AND METHODS FOR GENERATING ROBOTIC PROCESS AUTOMATION (RPA) VIA DOCUMENTATION

(71) Applicant: United Services Automobile Association (USAA), San Antonio, TX (US)

(72) Inventors: Pradeep R. Mangalagiri, Naperville, IL (US); Dustin Bowen Bitter, Lehi, UT (US); Gregory Meyer, San Antonio, TX (US); Christopher Russell, The Colony, TX (US); Jeanie Graciela Lopez, San Antonio, TX (US); Carol Lyn Lawrence, Fair Oaks Ranch, TX (US); Timothy Benjamin Czerlinsky, Dallas, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 364 days.

(21) Appl. No.: 18/103,838

(22) Filed: Jan. 31, 2023

Related U.S. Application Data

(60) Provisional application No. 63/305,095, filed on Jan. 31, 2022.

(51) Int. Cl.
*G05B 19/4155* (2006.01)

(52) U.S. Cl.
CPC .............. *G05B 19/4155* (2013.01); *G05B 2219/50391* (2013.01)

(58) Field of Classification Search
None
See application file for complete search history.

(56) References Cited

U.S. PATENT DOCUMENTS

| | | | |
|---|---|---|---|
| 8,442,940 B1 * | 5/2013 | Faletti ................... | G06F 40/30 707/610 |
| 2015/0088589 A1 * | 3/2015 | Marin ................ | G06Q 10/0633 705/7.26 |
| 2015/0339269 A1 * | 11/2015 | Konchitsky ........... | G06F 40/106 715/211 |
| 2020/0223061 A1 * | 7/2020 | Han ........................ | G06N 3/08 |

(Continued)

FOREIGN PATENT DOCUMENTS

| | | | | |
|---|---|---|---|---|
| CN | 113255614 A | * | 8/2021 | ............ G06F 18/214 |
| KR | 20210078995 A | * | 6/2021 | ............ G06F 3/0233 |
| KR | 102307471 B1 | * | 9/2021 | ........... H04M 3/5183 |

OTHER PUBLICATIONS

Lucanin et al, "A Visual Programming Language for Drawing and Executing Flowcharts",2011, Univ of Zagreb, pp. 1679-1684 (Year: 2011).*

(Continued)

*Primary Examiner* — David Earl Ogg
(74) *Attorney, Agent, or Firm* — Fletcher Yoder, P.C.

(57) ABSTRACT

Documentation may be used to automatically create a set of scripts to be executed by a robotic process automation system. A machine learning engine may be used to identify patterns in a first documentation and to then derive a flowchart descriptive of a documented process, subprocess, or combination thereof. The flowchart is compiled into a script executable by the robotic process automation system.

16 Claims, 1 Drawing Sheet

(56) References Cited

U.S. PATENT DOCUMENTS

2021/0271886 A1\* 9/2021 Zheng .................... G06V 20/46
2022/0113703 A1\* 4/2022 Singh ............... G06Q 10/06316

OTHER PUBLICATIONS

Hooshyar et al, "A Framework for Automatic Text-to-Flowchart Conversion: A Novel Teaching Aid for Novice Programmers", 2014, IEEE, pp. 7-12 (Year: 2014).\*

\* cited by examiner

SYSTEMS AND METHODS FOR GENERATING ROBOTIC PROCESS AUTOMATION (RPA) VIA DOCUMENTATION

CROSS-REFERENCE TO RELATED APPLICATION

This application claims priority to and the benefit of U.S. Provisional Patent Application No. 63/305,095, entitled "SYSTEMS AND METHODS FOR GENERATING ROBOTIC PROCESS AUTOMATION (RPA) VIA DOCUMENTATION" and filed on Jan. 31, 2022, the disclosure of which is incorporated by reference in its entirety for all purposes.

BACKGROUND

The present disclosure relates generally to systems and methods for generating robotic process automation. More specifically, the present disclosure relates generally to systems and methods for generating robotic process automation via documentation.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Banking and Insurance organizations often track and process data associated with individuals and organizations. For example, the banking and insurance organizations may include various processes to provide services to clients, to perform internal operations, and the like. The processes may be documented in various forms, such as in manuals, in presentations, in videos, and so on. For example, service manuals may describe how to provide customer support services. It would be beneficial to improve use of the entity's documentation.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a non-transitory computer-readable medium may include computer-executable instructions that, when executed by processors, cause the processors to monitor digital actions of a client interacting with an application running on a client device using robotic process automation. Further the processor may receive robotic process automation scripts based on monitoring the digital actions and adjust parameters of the application based on the robotic process automation scripts.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
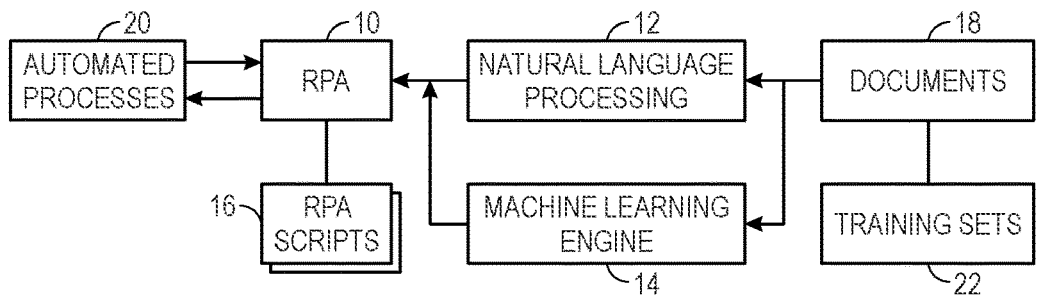
FIG. 1 is a flow diagram of implementing document processing for the creation of robotic process automation, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein the term "documents" or "documentation" may refer to manuals, videos, multimedia, help systems, and so on, used to document one or more processes, such as processes used by an entity during their course of operations. As used herein, "cloud" and "cloud services" may include computing services provided via cloud infrastructure such as Microsoft® Azure®, Amazon® Web Services (AWS), Google® Cloud Platform (GCP), and the like.

An entity or enterprise (e.g., insurance provider, financial services provider) may provide various services during operations, such as client intake, membership renewals, transaction processing (e.g., insurance transactions, banking transactions), and so on. For example, the entity's computing systems may include processes for debits, credits, banking transactions, insurance transactions, database queries, web-based transactions, and so on. It would be beneficial to automate certain of the processes using robotic process automation. However, with a large number of processes involved, it may be error prone and/or take too much time (e.g., multiple years of developer time) to create robotic process automation based on the number of processes involved. The techniques described herein more efficiently use documentation as the basis to create the robotic process automation in a practical application.

As used herein, robotic process automation includes a set of software tools (e.g., software robot) that may execute certain scripts to automate manual, and/or rule-based tasks, including client intake, membership renewals, transaction processing (e.g., insurance transactions, banking transactions), and so on. For example, the software robot may automate processes for debits, credits, banking transactions, insurance transactions, database queries, web-based transactions, and so on. In some embodiments, the software robot may perform tasks such as data entry, process standard transactions, or respond to certain queries, thereby automating a variety of tasks.

The techniques described herein may use existing documentation to transform the documentation, for example, into one or more scripts that automate the process being document. For example, by using natural language processing on text, by capturing images and/or by viewing videos included in the documentation for a given process, the techniques described herein may then derive one or more scripts that may be used via robotic process automation to perform the documented process. In certain embodiments, the documentation may include process steps. The documentation may include instructions describing the process. For example, natural language processing may be used to identify key words such as "in step one", "say", "ask", and so on, to derive that certain actions are to be taken. In another embodiment, machine learning may be used in addition to or alternative to natural language processing. The machine learning, as further described below, may be trained on existing documentation and processes to derive the robotic process automation scripts.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, the figure illustrates a flow diagram of an embodiment implementing a robotic process automation system 10, a natural language processing system 12, and a machine learning engine 14 to create a set of robotic process automation scripts 16 based on documentation 18. The robotic process automation system 10 may use the scripts 16 derived via the natural language processing 12 and/or the machine learning engine 14 to execute automated processes 20.

As mentioned above, the documents 18 may include manuals, such as printed manuals, online manuals, help systems (e.g., online help systems), audio files (e.g., audio instructions for how to perform a process), video files (e.g., video instructions showing a process being performed), and the like. In one embodiment, training sets 22 consisting of a documentation 18, such as a manual describing a process, may be used to create a corresponding script 16 by a human expert. The training set 22 may then incorporate the script 16. The training set may then be used by the machine learning engine 14 to derive new scripts 16 based on documentation not found in the training set. In some embodiments, the resulting scripts 16 may be further processed, for example, by testing the scripts 16 in a "sandbox" environment (e.g., virtual machine) and edited as desired.

In another embodiment, an expert system may be used to derive the new scripts 16 based on the documentation 18. For example, the expert system may include "if . . . then . . ." rules that may be used, e.g., with natural language processing, to transform the documentation 18 into the scripts 16. For example, as the expert system "reads" the documentation 18 it may trigger a rule that states "if documentation_word is 'step' then execute step_processing" to find certain key words such as "step", "say", "ask", "perform", and so on, representative of the documentation explaining a process. The expert system may then use further processing, e.g., executing a module called "step_processing" to continue reading the documentation 18, and in some embodiments, to execute the machine learning engine 14 for further derivations.

As more and more scripts 16 are derived from the documentation 18, the resulting scripts 16 and documentation 18 may be added to the training set 22, thus growing the training set 22 to provide enhanced input data for the machine learning engine 14. As mentioned earlier, the robotic process automation system 10 may execute the scripts 16, resulting in the automated processes 20. The automated processes 20, for example, may include using a graphical user interface (GUI) in an automated way to move a cursor to certain areas, activate a variety of controls (e.g., dropdown menus, listboxes, command buttons, radio buttons, and so on), type text, use text-to-voice software, and so on. Accordingly, the techniques described herein may provide for automation of the processes 20 via the robotic process automation system 10 using the documentation 18.

As mentioned earlier, the machine learning engine 14 may be used to process the documentation 18. For example, the machine learning engine 14 may determine patterns in the documentation 18, such as determining that a certain flowchart of logic elements (e.g., AND, OR, XOR, NOT, NAND, etc.) may be used to derive an automated process described in the documentation 18. As used herein, machine learning may refer to algorithms and statistical models that computer systems use to perform a specific task with or without using explicit instructions. For example, a machine learning process may generate a mathematical model based on a sample of data, known as "training data," in order to make predictions or decisions without being explicitly programmed to perform the task.

Depending on the inferences to be made, the machine learning engine 14 may implement different forms of machine learning. For example, in some embodiments (e.g., when particular known examples exist that correlate to future predictions or estimates that the machine learning engine 14 may be tasked with generating), the machine learning engine 14 may implement supervised machine learning. In supervised machine learning, a mathematical model of a set of data contains both inputs and desired outputs. This data is referred to as "training data" and may include a set of training examples. Each training example may have one or more inputs and a desired output, also known as a supervisory signal. In a mathematical model, each training example is represented by an array or vector, sometimes called a feature vector, and the training data is represented by a matrix. Through iterative optimization of an objective function, supervised learning algorithms may learn a function that may be used to predict an output associated with new inputs. An optimal function may allow the algorithm to correctly determine the output for inputs that were not a part of the training data. An algorithm that improves the accuracy of its outputs or predictions over time is said to have learned to perform that task.

Supervised learning algorithms may include classification and regression techniques. Classification algorithms may be used when the outputs are restricted to a limited set of values, and regression algorithms may be used when the outputs have a numerical value within a range. Similarity learning is an area of supervised machine learning closely related to regression and classification, but the goal is to learn from examples using a similarity function that measures how similar or related two objects are. Similarity learning has applications in ranking, recommendation systems, visual identity tracking, face verification, and speaker verification.

Additionally and/or alternatively, in some situations, it may be beneficial for the machine learning engine 14 to utilize unsupervised learning (e.g., when particular output types are not known). Unsupervised learning algorithms take a set of data that contains only inputs, and find structure in the data, like grouping or clustering of data points. The algorithms, therefore, learn from test data that has not been labeled, classified, or categorized. Instead of responding to feedback, unsupervised learning algorithms identify commonalities in the data and react based on the presence or absence of such commonalities in each new piece of data.

That is, the machine learning engine 14 may implement cluster analysis, which is the assignment of a set of observations into subsets (called clusters) so that observations within the same cluster are similar according to one or more predesignated criteria, while observations drawn from different clusters are dissimilar. Different clustering techniques make different assumptions on the structure of the data, often defined by some similarity metric and evaluated, for example, by internal compactness, or the similarity between members of the same cluster, and separation, the difference between clusters. In additional or alternative embodiments, the machine learning engine 14 may implement other machine learning techniques, such as those based on estimated density and graph connectivity.

As mentioned, the machine learning engine 14 may be used to identify patterns in the documents 18 such as a number of processes being documented, description of the processes being documented, devices used by the processes (e.g., mobile devices, workstations, laptops, servers), systems used by the processes (e.g., websites, software servers, software clients) usage of certain objects (e.g., command buttons, dropdowns, radio buttons) associated with the processes, time periods at which the processes are accessed, time analytics for completing tasks via the processes, and frequency that particular tasks are completed. Patterns may include predicting a logic flowchart for each process identified. Accordingly, the machine learning engine 14 may derive a predicted approximate number of processes and/or logic (e.g., flowcharts) describing the processes by relying on complex data patterns/relationships 14 that may not be conceived in the human mind.

The robotic process automation system 10 may execute the output of the machine learning engine 14, e.g., the scripts 16, to then automate the processes derived previously, resulting in the automated processes 20. The automated processes 20 may be executed, for example, by using software clients that are then "driven" by the robotic process automation system 10. For example, the robotic process automation system 10 may move a cursor, enter text (e.g., type text via a virtual keyboard), click on a GUI control, navigate through pages and/or screens, and so on. Accordingly, the techniques described herein may enable the creation and the execution of the automated processes 20 via the robotic automation system 10 based on the documentation 18.

Figure 2:
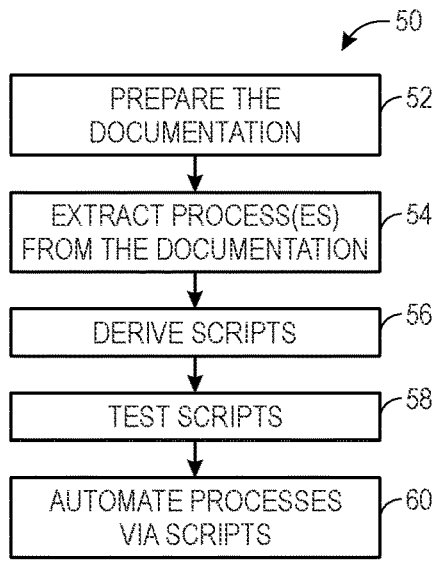
FIG. 2 is a block diagram of a process for creating the robotic process automation of FIG. 1 via documentation processing, in accordance with aspects of the present disclosure.

With the preceding in mind, FIG. 2 is a block diagram of an embodiment of a process 50 suitable for creating and/or executing the automated processes 20. As mentioned above, in addition to text, the documentation 18 may include recordings, video, podcasts, and so forth. The process 50 may prepare (block 52) the documentation 18, for example, by extracting text using voice-to-text techniques, by processing the text to divide sections of the documentation 18 into separate processes, by separating sections of the documentation 18 into subprocesses, by identifying key words or phrases (e.g., "step for", "say", "do"), by identifying logic elements (e.g., "if", "then", "not", "and", "or"), and the like. The preparation (block 52) of the documentation 18 may also include retrieving other documentation 18. For example, a manual may say "refer to manual X for more information" and thus the process 50 may retrieve manual X and parse manual X during the preparation (block 52) of the documentation 18.

The process 50 may then extract (block 54) one or more processes from the prepared documentation 18. For example, the process 50 may use the training set(s) 22 as input into the machine learning engine 14. As mentioned earlier, the training sets 22 may consist of the documentation 18, such as a manual describing a process, and the documentation 18 may be used to create a corresponding script 16 by a human expert. That is, a human expert may read the documentation 18 and create a script 16 that automates one or more processes described in the documentation 18. The training set 22 may thus consist of the documentation 18 and corresponding script(s) 16. The training set may then be used by the machine learning engine 14 to derive new scripts 16 based on documentation 18 not found in the training set. That is, the machine learning engine 14 may identify flowcharts/step-by-step processes that correspond to patterns in the documentation 18.

In one embodiment, the extraction of block 54 may be implemented by one or more processors through machine learning. For example, specific characteristics may be identified through a content analysis of the documentation. In one embodiment, steps in a step-by-step process described in the documentation may be identified by causing the processors to scan the documentation for enumerated lists with associated action words (verbs) and associated objects (nouns). In some embodiments, the processors may derive such lists by identifying illustrations representative of interactions with a graphical user interface (GUI) of a process to be implemented by an RPA script to identify the step-by-step process. The illustrations may be identified as representative of interactions with the GUI by comparing known GUI illustrations with illustrations in the documentation and identifying progressions within the illustrations.

The process 50 may then derive (block 56) one or more scripts based, for example, on the flowcharts extracted previously. In one embodiment, the flowcharts may be parsed and translated into corresponding scripts 16, for example, via a flowchart compiler. That is, the flowchart compiler may traverse the flowchart and convert all flowchart elements, including logic elements, action elements, decision elements (e.g., "if . . . then . . . " constructs) into script 16 computer code executable by the robotic process automation system 10. To do this, script elements may be discerned from the subjects described by each step in the step-by-step process.

For example, as mentioned above, the processor may identify verbs and nouns in an enumerated list of tasks for a particular process. Additionally and/or alternatively, the processor may identify objects interacted with in a sequence based upon illustrations of particular GUI interactions in the documentation. When verbs and nouns are identified, these enumerated items may be transformed into script steps. For example, one enumerated item may state "Click the OK button on the dialog box.". Using natural language processing (NLP) or another approach, the processor may identify the action as one or more of a subset of actions performable by the script (e.g., a button click operation that is enabled by a robotic process automation scripting software). The processor may identify one or more object of the GUI associated with the action and generate a script step using the one or more script actions applied to the one or more objects. The objects may be identified based upon metadata of the objects. For example, the "OK" button may be identified based upon traversing the underlying GUI code to find a button object with the label "OK". This process may be continued until all steps of the step-by-step process have a corresponding script step in the script.

The process 50 may then test (block 58), the scripts 16. For example, a script debugger tool, a quality assurance tool, an automated script testing tool, and so on, to execute the scripts 16 against test data. The tested scripts 16 may then be provided to the robotic process automation system 10 for execution. That is, the process 50 may then automate (block 60) the processes discovered at block 54 by executing the scripts 16. By providing for use of the documentation 18 to derive and then to execute a variety of processes, the techniques described herein may enable faster and more efficient creation of automated processes.

Figure 3:
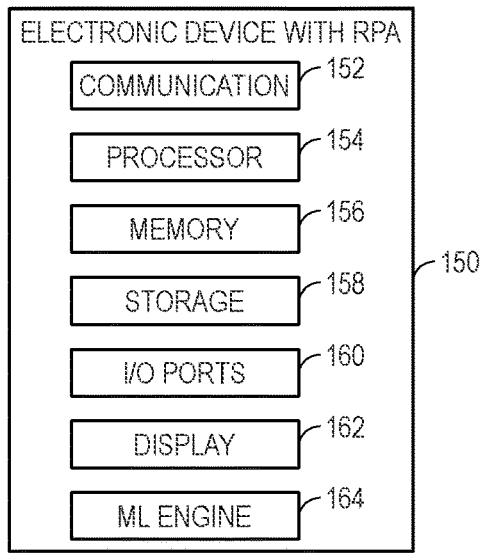
FIG. 3 is a block diagram of components of an electronic device with robotic process automation, in accordance with aspects of the present disclosure.

By way of background, it may be appreciated that the present approach may be implemented using one or more processor-based systems such as shown in FIG. 3 Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3 may be used in supporting or communicating with one or more virtual environments or computational instances on which the present approach may be implemented.

With this in mind, an example electronic device with robotic process automation 150 may include some or all of the computer components depicted in FIG. 3. FIG. 3 generally illustrates a block diagram of example components of the electronic device with robotic process automation 150. The components the electronic device with robotic process automation 150 may be interconnected to each other via communication paths such as busses. As illustrated, the electronic device with robotic process automation 150 may include various hardware components such as, but not limited to, a communication component 152, a processor 154, a memory 156, a storage component 158, input/output (I/O) ports 160, a display 162, a machine learning engine 164 (e.g., equivalent to the machine learning engine 14) and/or other computer components useful in performing the functions described herein.

The communication component 152 may be a wireless or wired communication component that may facilitate communication between the electronic device with robotic process automation 150, data sources, and various other computing systems via a network, the Internet, or the like. The processor 154 may include one or more microprocessors capable of performing instructions stored in the memory 156. Additionally or alternatively, the processor 154 may include application-specific integrated circuits (ASICs), field-programmable gate arrays (FPGAs), and/or other devices designed to perform some or all of the functions discussed herein without calling instructions from the memory 156. The processor 154 may also include multiple processors that may perform the operations described below.

The memory 156 may include any tangible, non-transitory, and computer-readable storage media. Although shown as a single block in FIG. 3 the memory 156 can be implemented using multiple physical units of the same or different types in one or more physical locations. Further, the memory 156 and the storage 158 may be any suitable articles of manufacture that can serve as media to store processor-executable code, data, or the like. These articles of manufacture may represent computer-readable media (e.g., any suitable form of memory or storage) that may store the processor-executable code used by the processor 154 to perform the presently disclosed techniques. As used herein, applications may include any suitable computer software or program that may be installed onto the electronic device with robotic process automation 150 and executed by the processor 154. The memory 156 and the storage 158 may represent non-transitory computer-readable media (e.g., any suitable form of memory or storage) that may store the processor-executable code used by the processor 154 to perform various techniques described herein. It should be noted that non-transitory merely indicates that the media is tangible and not a signal.

The I/O ports 160 may be interfaces that may couple to other peripheral components, such as input devices (e.g., keyboard, mouse), sensors, input/output (I/O) modules, and the like. The display 162 may operate as a human machine interface (HMI) to depict visualizations associated with software or executable code being processed by the processor 154. In one embodiment, the display 162 may be a touch display capable of receiving inputs from a user of the electronic device with robotic process automation 150. The display 162 may be any suitable type of display, such as a liquid crystal display (LCD), plasma display, or an organic light emitting diode (OLED) display, for example. Additionally, in one embodiment, the display 162 may be provided in conjunction with a touch-sensitive mechanism (e.g., a touch screen) that may function as part of a control interface for the electronic device with robotic process automation 150. It should be noted that the components described above with regard to the electronic device with robotic process automation 150 are examples and the electronic device with robotic process automation 150 may include additional or fewer components relative to the illustrated embodiment.

By employing robotic process automation, coding expertise may be reduced, and more effective handling of documentation of processes may be provided. The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A non-transitory computer-readable medium, comprising computer-executable instructions that, when executed by one or more processors, cause the one or more processors to:
identify, via a machine learning engine, patterns in a first documentation using a training set comprising a second documentation and one or more secondary flowcharts described in the second documentation, wherein the patterns are used to derive a flowchart descriptive of a documented process, of a documented subprocess, or a combination thereof; and
compile the flowchart into a script, wherein the script is executable by a robotic process automation system.

2. The non-transitory computer-readable medium of claim 1, wherein the first documentation comprises:
text manuals describing the documented process, the documented subprocess, or the combination thereof; or
audio describing the documented process, the documented subprocess, or the combination thereof; or
video describing the documented process, the documented subprocess, or the combination thereof; or
a combination thereof.

3. The non-transitory computer-readable medium of claim 1, wherein the computer-executable instructions cause the one or more processors to prepare the first documentation by identifying key words, phrases, logic elements, or a combination thereof, in the first documentation.

4. The non-transitory computer-readable medium of claim 1, comprising computer-executable instructions, that when executed by the one or more processors cause the one or more processors to:
identify the patterns in the first documentation, by:
identifying, in the first documentation, an enumerated list of actions; and
identifying, in the first documentation, objects that the enumerated list of actions are applied to; and
derive the flowchart from the enumerated list of actions and the objects that the enumerated list of actions are applied to.

5. The non-transitory computer-readable medium of claim 4, comprising computer-executable instructions, that when executed by the one or more processors cause the one or more processors to:
compile the flowchart into the script, by:
identifying script actions that correspond to the enumerated list of actions; and
inserting, into the script, the script actions, with an indication to apply the script actions to graphical user interface (GUI) objects corresponding to the objects that the enumerated list of actions are applied to in the first documentation.

6. The non-transitory computer-readable medium of claim 1, comprising computer-executable instructions, that when executed by the one or more processors cause the one or more processors to:
identify the patterns in the first documentation, by:
identifying, in the first documentation, illustrations representative of interactions with a graphical user interface (GUI); and
identifying, in the first documentation, objects that the interactions are applied to; and
derive the flowchart from the interactions and the objects.

7. The non-transitory computer-readable medium of claim 6, comprising computer-executable instructions, that when executed by the one or more processors cause the one or more processors to:
compile the flowchart into the script, by:
identifying script actions that correspond to the interactions; and
inserting, into the script, the script actions, with an indication to apply the script actions to GUI objects corresponding to the objects.

8. A computer-implemented method, comprising:
identifying, via a machine learning engine, patterns in a first documentation;
using a training set comprising a second documentation and one or more secondary flowcharts described in the second documentation to identify, via the machine learning engine, the patterns in documentation;
deriving a flowchart descriptive of a documented process, of a documented subprocess, or a combination thereof; and
compiling the flowchart into a script, wherein the script is executable by a robotic process automation system.

9. The method of claim 8, wherein the first documentation comprises:
text manuals describing the documented process, the documented subprocess, or the combination thereof; or
audio describing the documented process, the documented subprocess, or the combination thereof; or
video describing the documented process, the documented subprocess, or the combination thereof; or
a combination thereof.

10. The method of claim 8, comprising preparing the first documentation by identifying key words, phrases, logic elements, or a combination thereof, in the first documentation.

11. The method of claim 8, comprising:
identifying the patterns in the first documentation, by:
identifying, in the first documentation, an enumerated list of actions;
identifying, in the first documentation, objects that the enumerated list of actions are applied to; and
deriving the flowchart from the enumerated list of actions and the objects that the enumerated list of actions are applied to.

12. The method of claim 11, comprising:
compiling the flowchart into the script, by:
identifying script actions that correspond to the enumerated list of actions; and
inserting, into the script, the script actions, with an indication to apply the script actions to graphical user interface (GUI) objects corresponding to the objects that the enumerated list of actions are applied to in the first documentation.

13. The method of claim 8, comprising:
identifying the patterns in the first documentation, by:
- identifying, in the first documentation, illustrations representative of interactions with a graphical user interface (GUI);
- identifying, in the first documentation, objects that the interactions are applied to; and deriving the flowchart from the interactions and the objects.

14. The method of claim 13, comprising:
compiling the flowchart into the script, by:
- identifying script actions that correspond to the interactions; and
- inserting, into the script, the script actions, with an indication to apply the script actions to GUI objects corresponding to the objects.

15. A robotic process automation (RPA) script generation system, comprising:
- a natural language processor configured to receive a first documentation and parse the first documentation into computer-readable data;
- a machine learning engine configured to identify patterns in the computer-readable data using a training set comprising a second documentation and one or more secondary flowcharts described in the second documentation and derive a flowchart descriptive of a documented process, of a documented subprocess, or a combination thereof of the first documentation; and
- an RPA script generation engine configured to compile the flowchart into an RPA script, wherein the RPA script is executable by a robotic process automation system to automate subsequent playback of the RPA script in a graphical user interface (GUI).

16. The RPA script generation system of claim 15, wherein:
identifying the patterns in the first documentation, comprises:
- identifying, in the first documentation, an enumerated list of actions; and
- identifying, in the first documentation, action objects that the enumerated list of actions are applied to; or
- identifying, in the first documentation, illustrations representative of interactions with the GUI; and
- identifying, in the first documentation, illustration objects that the interactions are applied to; and deriving the flowchart comprises:
- deriving the flowchart from the enumerated list of actions and the action objects that the enumerated list of actions are applied to; or
- deriving the flowchart from the interactions and the illustration objects; and the RPA script generation system is configured to:
identify script actions that correspond to the enumerated list of actions, the interactions, or both; and
insert, into an RPA script, the script actions, with an indication to apply the script actions to GUI objects corresponding to the action objects, the illustration objects, or both.

* * * * *